United States Patent
Yoshimoto et al.

(10) Patent No.: US 7,627,207 B2
(45) Date of Patent: Dec. 1, 2009

(54) DISPERSION COMPENSATING METHOD AND DISPERSION COMPENSATING APPARATUS

(75) Inventors: Masahiro Yoshimoto, Kawasaki (JP); Futoshi Izumi, Kawasaki (JP); Makoto Takakuwa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/689,946

(22) Filed: Mar. 22, 2007

(65) Prior Publication Data

US 2007/0177878 A1    Aug. 2, 2007

Related U.S. Application Data

(60) Division of application No. 11/437,803, filed on May 22, 2006, now abandoned, which is a continuation of application No. PCT/JP2004/001980, filed on Feb. 20, 2004.

(51) Int. Cl.
G02B 6/26 (2006.01)
G02B 6/42 (2006.01)
H04B 10/12 (2006.01)

(52) U.S. Cl. .................................. 385/27; 398/147
(58) Field of Classification Search ................. 398/81, 398/82, 147, 148, 158, 159; 385/15, 24, 385/27
See application file for complete search history.

(56) References Cited

U.S. PATENT DOCUMENTS

| | | | |
|---|---|---|---|
| 5,969,840 A | 10/1999 | Roberts | 398/32 |
| 6,081,360 A | 6/2000 | Ishikawa et al. | 398/147 |
| 6,204,949 B1 | 3/2001 | Ishikawa et al. | 398/159 |
| 6,370,300 B1 | 4/2002 | Eggleton et al. | 385/37 |
| 6,728,026 B2 * | 4/2004 | Lee et al. | 359/337.11 |
| 6,985,284 B2 * | 1/2006 | Denkin et al. | 359/334 |
| 7,139,478 B2 * | 11/2006 | Eggleton et al. | 398/29 |
| 7,324,758 B2 * | 1/2008 | Marutani et al. | 398/147 |
| 2003/0007726 A1 * | 1/2003 | Kosaka et al. | 385/27 |
| 2005/0111847 A1 | 5/2005 | Jasti et al. | 398/147 |
| 2007/0177878 A1 * | 8/2007 | Yoshimoto et al. | 398/147 |

FOREIGN PATENT DOCUMENTS

| | | |
|---|---|---|
| JP | 10-107740 | 4/1998 |
| JP | 11-088261 | 3/1999 |
| JP | 11-088262 | 3/1999 |
| JP | 2001-223640 | 8/2001 |
| JP | 2003-228032 | 8/2003 |

OTHER PUBLICATIONS

Japanese Office Action issued Jan. 13, 2009 in corresponding Japanese Patent Application No. 2006-510127.

* cited by examiner

*Primary Examiner*—Daniel Petkovsek
(74) *Attorney, Agent, or Firm*—Staas & Halsey LLP

(57) ABSTRACT

A dispersion compensating method for carrying out automatic level control with the use of target output power and an ASE correction value corresponding to the number of wavelengths to multiplex and making output power of a wavelength multiplexed signal constant, comprising the steps of: switching into automatic gain control in which the output power of the wavelength multiplexed signal is made constant, to carry out increase/decrease of the wavelengths to multiplex; varying a dispersion compensating amount based on the increase/decrease of the wavelengths by the automatic gain control; calculating an ASE variation amount due to the change in the dispersion compensating amount; and reflecting the ASE variation amount on the ASE correction value and switching into the automatic level control.

16 Claims, 13 Drawing Sheets

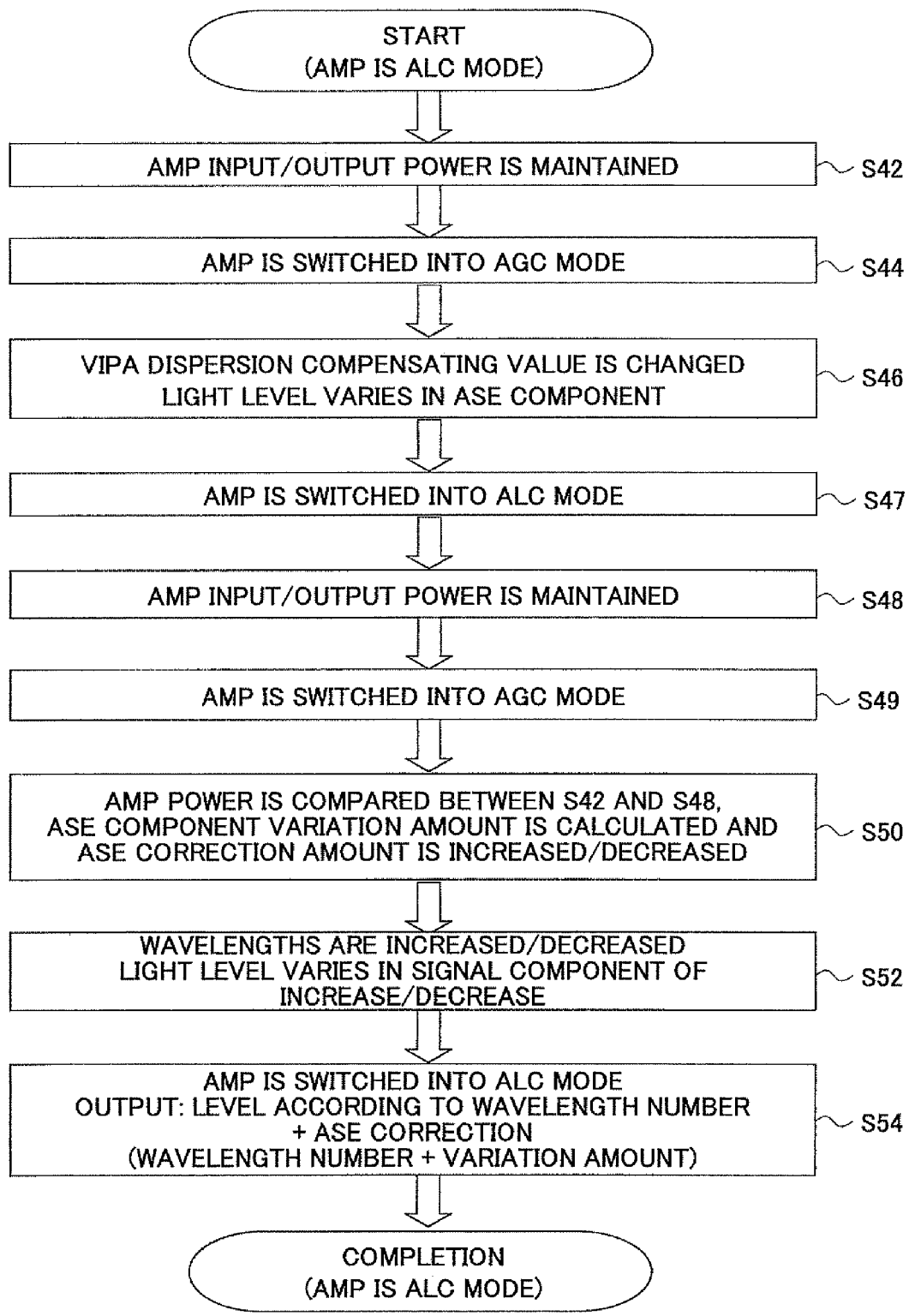

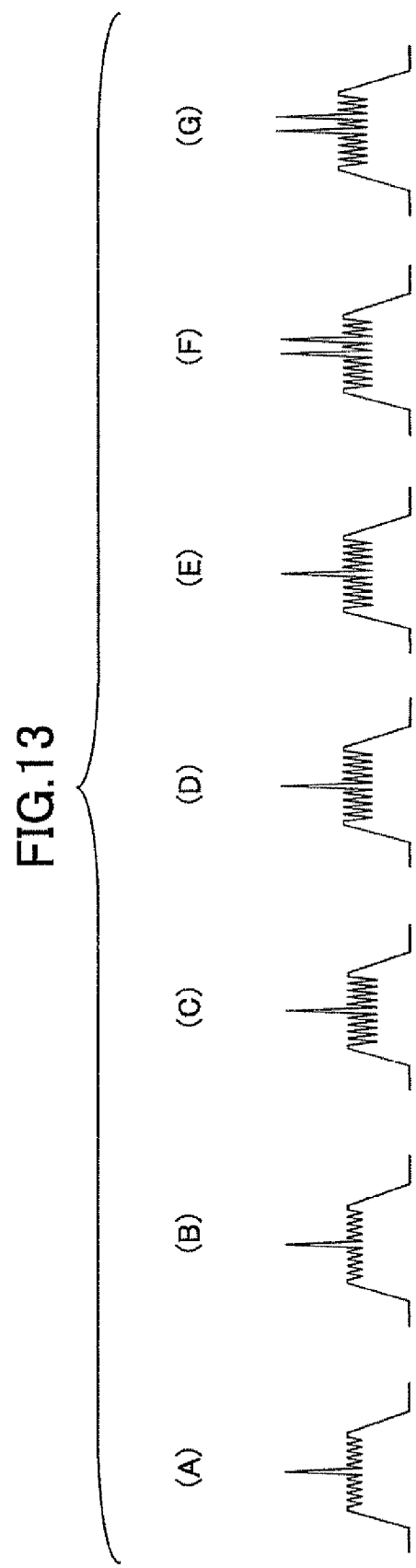

DISPERSION COMPENSATING METHOD AND DISPERSION COMPENSATING APPARATUS

CROSS-REFERENCE TO RELATED APPLICATION

This application is a divisional of U.S. application Ser. No. 11/437,803 filed May 22, 2006 now abandoned, the disclosure of which is hereby incorporated herein by reference in its entirety.

This application is a U.S. continuation application filed under 35 USC 111(a) claiming benefit under 35 USC 120 and 365(c) of PCT application JP2004/001980, filed on Feb. 20, 2004. The foregoing application is hereby incorporated herein by reference.

BACKGROUND OF THE INVENTION

1. Field of the Invention

The present invention relates to a dispersion compensating method and a dispersion compensating apparatus, and, to a dispersion compensating method and a dispersion compensating apparatus for compensating wavelength dispersion occurring in a transmission path fiber of a wavelength division multiplexer transmission system.

2. Description of the Prior art

Recently, a modulation rate per one wavelength of a wavelength division multiplexer (WDM) transmission system changes from 2.4 Gbps to 10 Gbps. In the situation, a WDM dispersion compensating method is increasing in its importance.

In the WDM transmission system, there are a method of carrying out dispersion compensation for each wavelength and a method of carrying out dispersion compensation for all the wavelengths in a lump. In the dispersion compensating method per each wavelength, the costs are very higher than the lump dispersion compensating method. On the other hand, a transmission path dispersion slope varies for each particular transmission fiber, and thus transmission path dispersion cannot be compensated completely throughout all the wavelengths in the lump dispersion compensating method. Therefore, a method exists in which the band is divided into several bands, and dispersion compensation is carried out.

In a conventional WDM transmission system, in order to lower the costs, many cases the lump dispersion compensating method is applied. In any method, a dispersion compensator is such that a dispersion compensating fiber (DCF) is cut into lengths according to dispersion amounts, is disposed according to the transmission path dispersion amount of each repeating section, and carries out the compensation.

FIG. 1 shows a configuration of one example of a dispersion compensating system in the WDM transmission system. In FIG. 1, a transmission apparatus 10 carries out wavelength multiplexing on wavelengths $\lambda_1$ through $\lambda_n$ and transmits the same to a transmission path fiber 11. A repeating apparatus 12 amplifies the wavelength multiplexed signal received from the transmission path fiber 11, supplies the same to a dispersion compensating fiber 13, again amplifies the same, carried out dispersion compensation, and transmits it to a transmission path fiber 14.

In the same manner, a repeating apparatus 15 carries out dispersion compensation on the wavelength multiplexed signal received from the transmission path fiber 14, and transmits the same to a transmission path fiber 16. In the same manner, the wavelength multiplexed signal undergoes dispersion compensation every repeating apparatus. Thus, the wavelength multiplexed signal is supplied to a receiving apparatus 18 from a transmission path fiber 17. The receiving apparatus 18 carries out dispersion compensation in the same manner as that in the repeating apparatus 12 on the wavelength multiplexed signal received from the transmission path fiber 14. After that, it separates the wavelength multiplexed signal every wavelength, and outputs the respective wavelengths $\lambda_1$ through $\lambda_n$.

Further, for example, Japanese Laid-open Patent Application No. 2001-223640 discloses that, the number of light wavelengths to multiplex and optical repeater output are detected, and, a dispersion compensating amount in a wavelength dispersion compensator provided in a transmission side or a receiving side of an optical fiber transmission path is changed according to increase/decrease of the number of wavelengths to multiplex, a change in the light signal output power in the optical fiver due to the change of optical repeater output, or such.

In the conventional method, based on a previously measured transmission path dispersion amount, a dispersion compensating fiber of a corresponding dispersion amount should be prepared. Therefore, upon system establishment, merely wire materials can be purchased before the transmission path dispersion amount is obtained. The dispersion compensating amount product cannot be produced until then.

Further, for when a dispersion compensating menu having respective dispersion compensating fibers correspond to different dispersion amounts, and the dispersion compensation fiber product is obtained according to the desired dispersion amount, the diversion compensating menu in a very large size is required since a difference between the minimum distance and the maximum distance increases along with an increase of the length of the recent repeating transmission distance. Especially, when the lump dispersion compensating method is applied as mentioned above, the steps in the dispersion compensating menu become finer and enormous in the number, in order to compensate a permissible range of a residual dispersion of all the wavelengths.

On the other hand, along with an increase in the number of wavelengths in the WDM transmission system, a light level difference in a total level state from one wavelength through full wavelengths increases, and also, the WDM transmission system having an increased transmission span light loss is demanded.

For such a case, since an optical amplifier is applied to amplify a lump of wide band wavelengths in the WDM transmission system, the optical amplifier's ASE (amplified spontaneous emission) light becomes larger than the signal power. Therefore, it is necessary to carry out ASE correction to correct the ASE light, and thus, adjust the output power of a signal light component to the optical fiber to a designed value. This is because, as the output power increases, the dispersion compensating amount changes, and also, error may occur due to nonlinear effect.

Further, the maximum permissible transmission path loss of the current WDM transmission system is limited by the minimum wavelength number (upon one wavelength usage) interruption detection/restoration level. That is, a distance within which a subsequent stage optical amplifier can recognize light input and start up corresponds to the maximum permissible transmission path loss.

There, when the wavelength number is small, nonlinear effect called four light wave mixture (FWM) can be inhibited by an increase of the wavelength interval. Therefore, an increase of the output power upon a small wavelength number such as one wavelength may result in an increase of the permissible maximum transmission path loss (an increase in the distance within which the subsequent stage optical amplifier can recognize the light input and start up). However, the output power increase results in a change in the dispersion compensating amount, and also, results in an influence of self phase modulation (SPM) becoming remarkable.

On the other hand, development of a variable dispersion compensator is proceeded with as a device in which the lump dispersion compensation can be made and its dispersion amount can be changed. However, the variable dispersion compensator is such that, when the dispersion compensating amount is changed, a passing wavelength band changes. As a result, ALC control of an optical amplifier provided together with the variable dispersion compensator may malfunction, and thus, OSNR (optical SN ratio) may degrade.

SUMMARY OF THE INVENTION

A general object of the present invention is to provide a dispersion compensating method and a dispersion compensating apparatus which do not need an enormous dispersion compensating menu, and can avoid degradation in OSNR.

In order to achieve this object, one aspect of the present invention is configured to vary a dispersion compensating amount to compensate variation in output power of each wavelength, in a dispersion compensating method of a wavelength division multiplex transmission system in which output power is variable according to the number of wavelengths to multiplex.

By this wavelength dispersion compensation designing method, an enormous dispersion compensating menu is not required as a result of the variable dispersion compensator being used, and degradation of OSNR can be avoided as a result of the dispersion compensating amount is varied to compensate variation in the output power of each wavelength.

BRIEF DESCRIPTION OF THE DRAWINGS

Other objects and further features of the present invention will become more apparent from the following detailed description when read in conjunction with the accompanying drawings:

FIG. 12 shows a flow chart of wavelength increase according to the dispersion compensating method in a fourth embodiment of the present invention; and FIG. 13 shows a wavelength/output power characteristics of a wavelength multiplexed signal.

DETAILED DESCRIPTION OF THE PREFERRED EMBODIMENTS

Below, embodiments of the present invention are described based on figures.

In a WDM transmission system, in order to inhibit level variation due to variation of transmission path loss, each optical amplifier carries out output constant control in ALC (automatic level control), and carries out AGC only when the number of wavelengths is changed.

Figure 1:
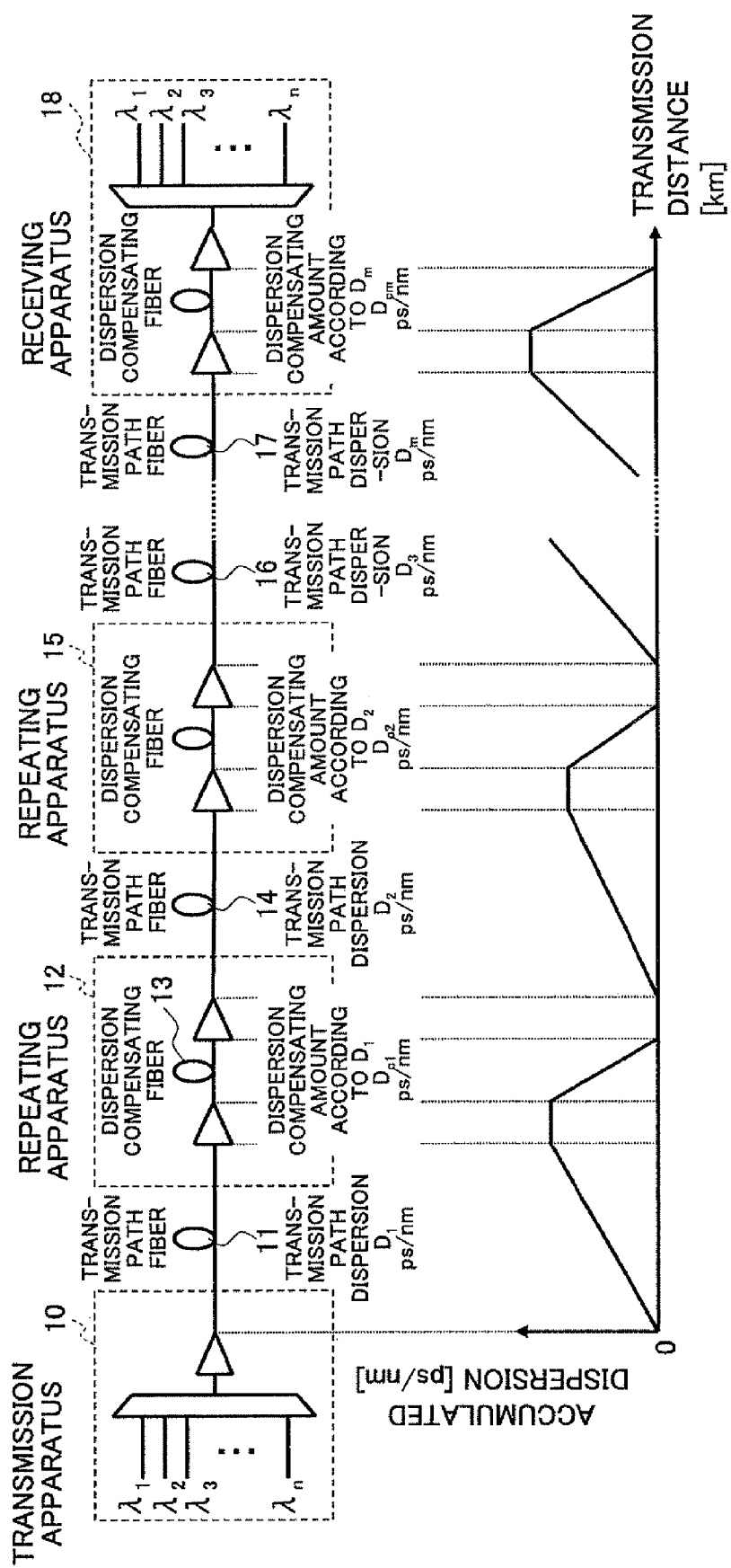
FIG. 1 is a configuration diagram of one example of a dispersion compensating system in a WDM transmission system.
Figure 2:
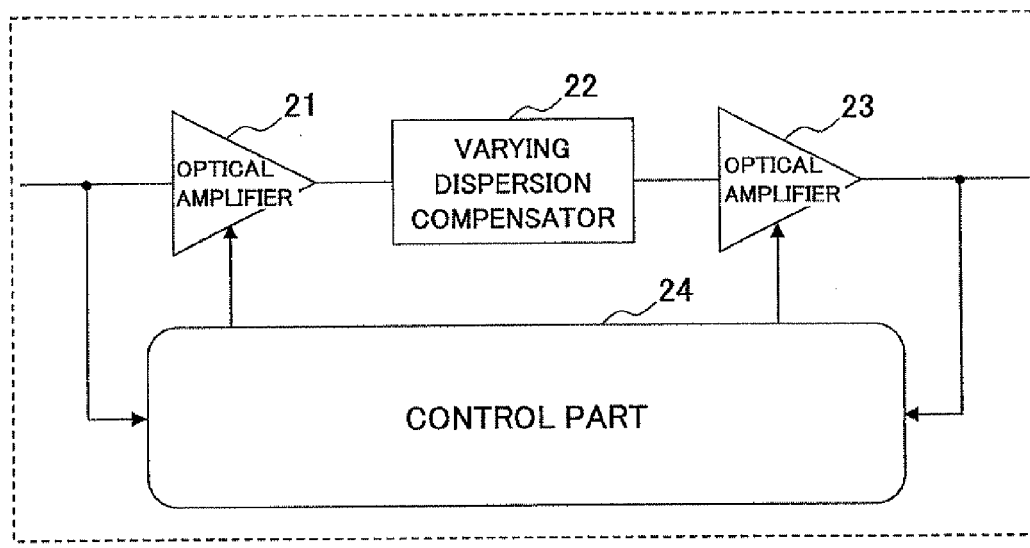
FIG. 2 is a block diagram of a dispersion compensating apparatus according to the present invention.

FIG. 2 shows a block diagram of a dispersion compensating apparatus according to the present invention. This dispersion compensating apparatus is applied as a dispersion compensating part in the repeating apparatus 12 or 15, or in the receiving apparatus 18. In FIG. 2, after the wavelength multiplexed signal received from the transmission path fiber is amplified by a former stage optical amplifier 21, it is provided to a variable dispersion compensator 22, is made to undergo dispersion compensation in the variable dispersion compensator 22, is amplified by a latter stage optical amplifier 23, and, is output to the transmission path fiber.

A control part 24 monitors input light intensity in the former stage optical amplifier 21 with an optical detector, also monitors output light intensity in the latter stage optical amplifier 23 with an optical monitor, and carries out ALC control or AGC control of the former stage optical amplifier 21 and the latter stage optical amplifier 23. Further, the control part 24 carries out variable control of dispersion compensation in the variable dispersion compensator 22.

As the variable dispersion compensator 22, for example, an apparatus proposed by the Applicant of the present application in Japanese Laid-open Patent Application No. 2002-258207 is applied. In this apparatus, light of each wavelength angularly dispersed and output by a VIPA (virtually imaged phased array) plate is condensed by a lens, is diffracted by a grating pair which acts both as light path generating means and light path shift amount varying means, a shift is provided between light paths of different wavelengths, the light is reflected by a dispersion flatting three-dimensional mirror, and again is input to the VIPA plate. Thereby, the light is applied at parts having different dispersion compensating amounts according to light path difference of the three-dimensional mirror by the wavelengths, and a wavelength dispersion amount can be obtained for each wavelength. Thus, adjustment of the wavelength dispersion amounts throughout the wavelengths of the wavelength multiplexed signal and adjustment of the wavelength dispersion slop are carried out separately.

Figure 3:
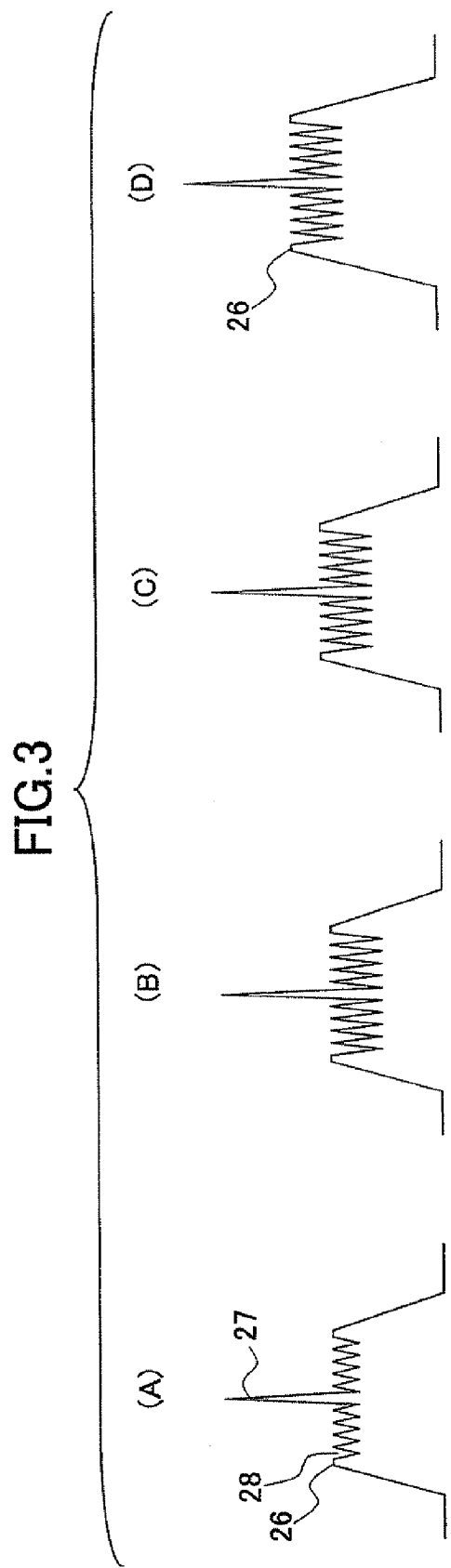
FIG. 3 shows wavelength/output power characteristics of a wavelength multiplexed signal.

Wavelength/output power characteristics of the wavelength multiplexed signal output from the latter stage optical amplifier 23 of the dispersion compensating apparatus are shown in FIG. 3, (A). In the figure, a trapezoidal part 26 corresponds to ASE light, and a peak 27 corresponds to multiplexed signal wavelengths. A plurality of grooves 28 occur in the ASE light due to attenuation of the ASE light by the grating of the variable dispersion compensator 22.

When the dispersion compensating amount is changed by the variable dispersion compensator utilizing the light path difference, light loss varies due to the light path difference of each dispersion compensating amount, if the ALC output target level is made to be a level corresponding to the wavelength number and ASE correction according to the wavelength number is carried out. As a result, as shown in FIG. 3, (B), the wavelength multiplexed signal output by the latter stage optical amplifier 23 has the deeper grooves 28 in the ASE light. Thereby, the output light monitored value of the latter stage optical amplifier 23 degrades.

When the ALC control is started up in this state, the amplification of the latter stage optical amplifier increases, the attenuation amount of the ASE light is compensated, and thus, the wavelength multiplexed signal output by the latter stage optical amplifier 23 becomes such as that shown in FIG. 3, (C). Especially, when the signal wavelength number is small, the amplification for a noise component also increases as the amplification of the latter stage optical amplifier 23 increases, and thus, degradation in OSNR (optical SN ratio) becomes remarkable.

That is, since a light loss change due to a change in the dispersion compensating amount in the variable dispersion compensator corresponds to the ASE light component variation, the ASE correction value when the dispersion compensating amount is changed is updated in such a manner that, the above-mentioned ASE light component amount (ASE variation amount) is added to the ASE correction amount according to the wavelength number. Thereby, variation in the output power can be compensated, the wavelength multiplexed signal output by the latter stage optical amplifier 23 becomes such that, as shown in FIG. 3, (D), for example the ASE light level increases, thus decrease in the output light power monitored value of the latter stage optical amplifier 23 can be avoided, increase in the amplification in the latter stage optical amplifier 23 when the ALC control is started up can be avoided, and degradation in OSNR can be avoided.

Figure 4:
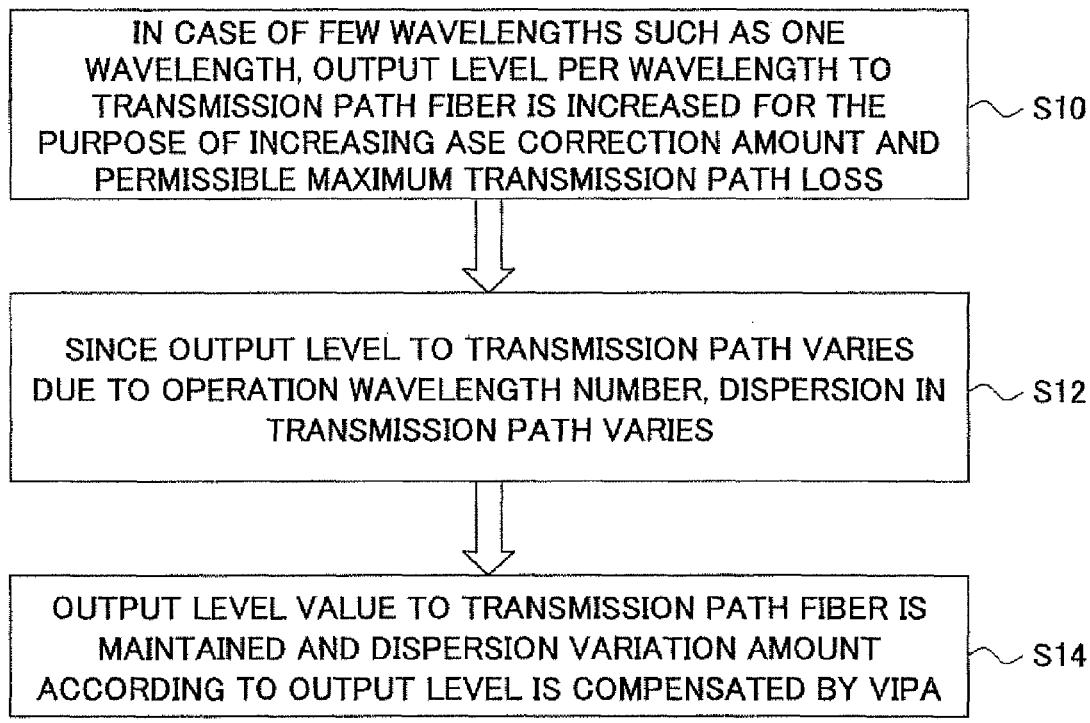
FIG. 4 shows a flow chart of one embodiment of a dispersion compensating method according to the present invention.

FIG. 4 shows a flow chart of a first embodiment of the dispersion compensating method according to the present invention. This processing is carried out by the control part 24. In the figure, in Step S10, when the wavelength number of the wavelength multiplexed signal is as small as one wavelength or such, the control part 24 increases the output level per one wavelength sent to the transmission path fiber from the latter stage optical amplifier 23, for the purpose of increasing the ASE correction amount and increasing the permissible maximum transmission loss.

In Step S12, along with a variation in the output level due to the number of the operation wavelengths, the dispersion amount in the transmission path fiber varies due to an influence of the self phase modulation (SPM).

Therefore, in Step S14, the output level per one wavelength output to the transmission path fiber is maintained, and also, a variation amount in the dispersion amount in the transmission path fiber is compensated as a result of the dispersion compensation in the variable dispersion compensator 22 being controlled.

When the wavelength increase/decrease is carried out simultaneously with the change in the dispersion compensating amount in the variable dispersion compensator, calculation may not be made properly. Therefore, the wavelength increase/decease control and the dispersion compensating amount change in the dispersion compensator are carried out separately. In this case, the dispersion amount change is carried out after the wavelength increase/decrease control in one method, or the wavelength increase/decrease control is carried out after the dispersion amount change in another method.

Figure 5:
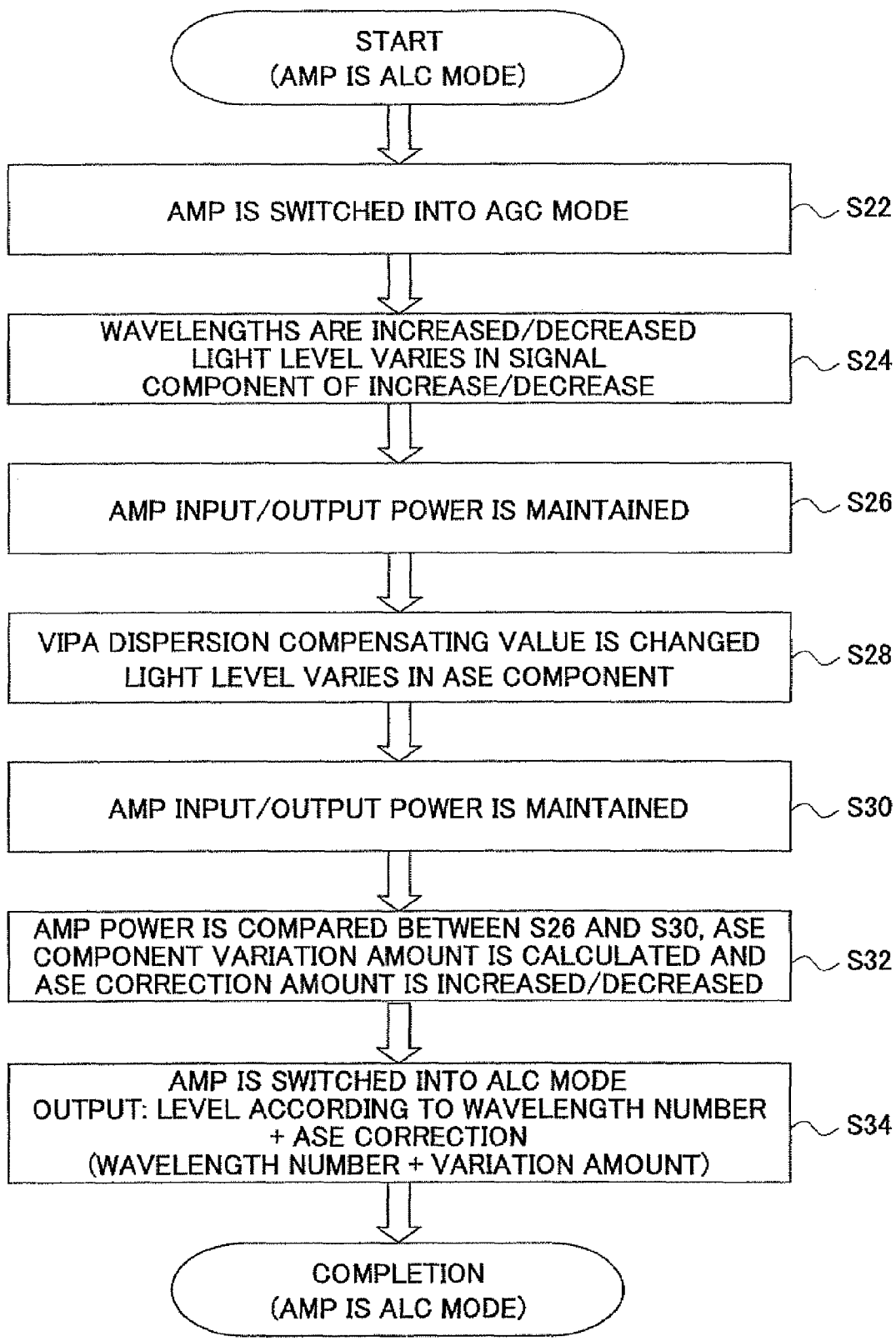
FIG. 5 shows a flow chart of wavelength increase according to the dispersion compensating method in a first embodiment of the present invention.

FIG. 5 shows a flow chart of a first embodiment of the wavelength increase/decrease according to the dispersion compensating method of the present invention. This processing is carried out by the control part 24. Upon beginning of this processing, the latter stage optical amplifier 23 is controlled by the control part 24 in an ALC mode such that the ALC output target value is set in a level corresponding to the wavelength number and ASE control corresponding to the wavelength number is carried out. The wavelength multiplexed signal output by the latter stage optical amplifier 23 becomes such as that shown in FIG. 6, (A).

First, in Step S22, the control part 24 switches into an AGC mode, and carries out AGC control of the former stage optical amplifier 21 and the latter stage optical amplifier 23. Thereby, as shown in FIG. 6, (B), the power of the wavelength multiplexed signal output by the latter stage optical amplifier 23 does not change.

Figure 6:
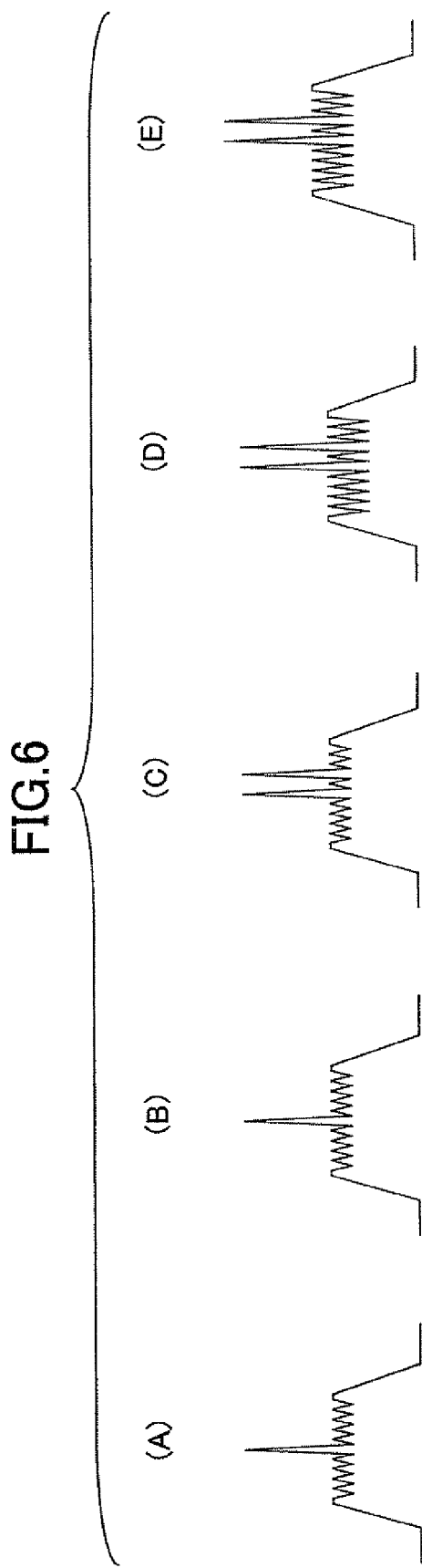
FIG. 6 shows a wavelength/output power characteristics of a wavelength multiplexed signal.

Next, when the wavelength number in the wavelength multiplexed signal is increased/decreased in Step S24, the power of the wavelength multiplexed signal output from the latter stage optical amplifier 23 changes for an amount corresponding to the wavelengths thus increased/decreased, and thus, becomes such as that shown in FIG. 6, (C). In Step S26, the wavelength multiplexed signal power input to the former stage optical amplifier 21 and the wavelength multiplexed signal power output by the latter stage optical amplifier 23 are detected, and stored in the control part 24.

In Step S28, based on the wavelength increase/decrease in the wavelength multiplexed signal, the dispersion compensating amount in the variable dispersion compensator 22 is changed. Thereby, the wavelength multiplexed signal power output by the latter stage optical amplifier 23 varies for an amount corresponding to a variation amount of the ASE light, and the wavelength multiplexed signal power output by the latter stage optical amplifier 23 becomes such as that shown in FIG. 6, (D). In Step S30, the wavelength multiplexed signal power input to the former stage optical amplifier 21 and the wavelength multiplexed signal power output by the latter stage optical amplifier 23 are detected, and stored in the control part 24.

In Step S32, the input/output wavelength multiplexed signal powers detected in Step S26 and Step S30 respectively are compared, the variation amount in the ASE light along with the change in the dispersion compensating amount in the variable dispersion compensator is calculated, the variation amount in the ASE light is added to and thus is reflected on the ASE correction amount, and thus, the ASE correction amount is updated.

Next, in Step S34, the control part 24 switches into the ALC mode, carries out ALC control of the former stage optical amplifier 21 and the latter stage optical amplifier 23 such that the ALC output target level is set in the level corresponding to the wavelength number and the ASE correction is carried out by the ASE correction amount reflecting the variation amount of the ASE light corresponding to the wavelength number. Thus, the processing is finished. Thereby, the wavelength multiplexed signal power output by the latter stage optical amplifier 23 becomes such as that shown in FIG. 6, (E).

Figure 7:
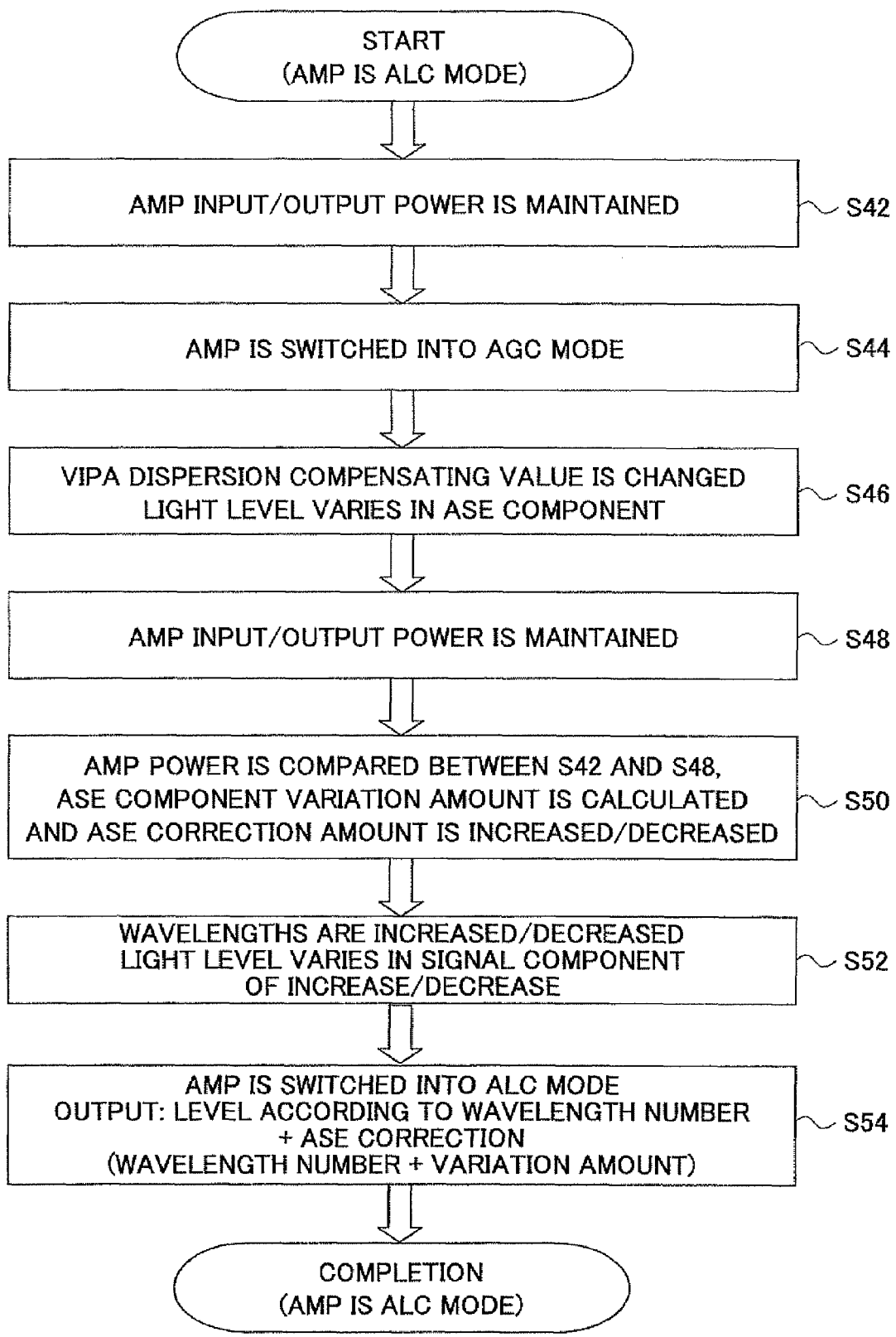
FIG. 7 shows a flow chart of wavelength increase according to the dispersion compensating method in to a second embodiment of the present invention.

FIG. 7 shows a flow chart of a second embodiment of the wavelength increase/decrease according to the dispersion compensating method of the present invention. This processing is carried out by the control part 24. Upon beginning of this processing, the latter stage optical amplifier 23 is controlled by the control part 24 in an ALC mode such that the ALC output target value is set in a level corresponding to the wavelength number and ASE control corresponding to the wavelength number is carried out. The wavelength multiplexed signal output by the latter stage optical amplifier 23 becomes such as that shown in FIG. 8, (A), FIG. 9, (A).

Figure 8:
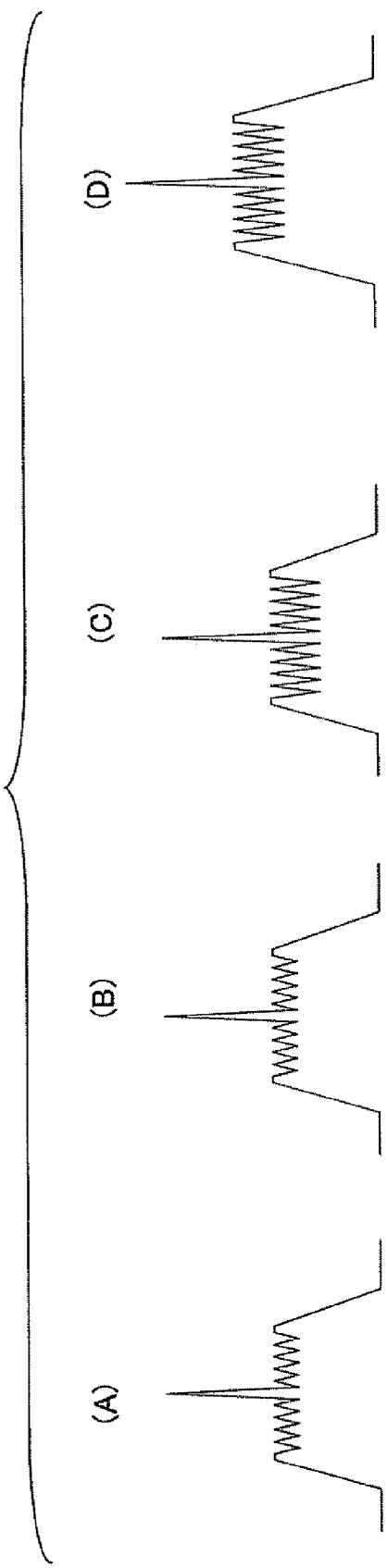
FIG. 8 shows a wavelength/output power characteristics of a wavelength multiplexed signal.
Figure 9:
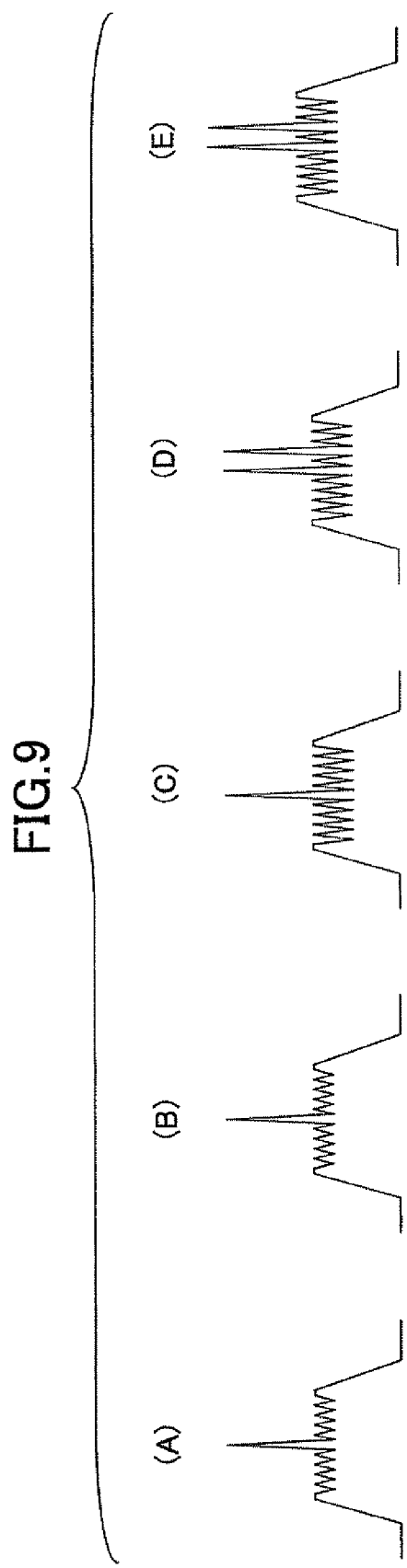
FIG. 9 shows a wavelength/output power characteristics of a wavelength multiplexed signal.

First, in Step S42, the wavelength multiplexed signal power input to the former stage optical amplifier 21 and the wavelength multiplexed signal power output by the latter stage optical amplifier 23 are detected, and are stored in the control part 24. In Step S44, the control part 24 switches into an AGC mode, and carries out AGC control of the former stage optical amplifier 21 and the latter stage optical amplifier 23. Thereby, as shown in FIG. 8, (B), FIG. 9, (B), the power of the wavelength multiplexed signal output by the latter stage optical amplifier 23 does not change.

In Step S46, based on the wavelength increase/decrease in the wavelength multiplexed signal, the dispersion compensating amount is changed. Thereby, the wavelength multiplexed signal power output by the latter stage optical amplifier 23 varies for an amount corresponding to a variation amount of the ASE light, and the wavelength multiplexed signal power output by the latter stage optical amplifier 23 becomes such as that shown in FIG. 8, (C), FIG. 9, (C). In Step S48, the wavelength multiplexed signal power input to the former stage optical amplifier 21 and the wavelength multiplexed signal power output by the latter stage optical amplifier 23 are detected, and are stored in the control part 24.

In Step S50, the input/output wavelength multiplexed signal powers detected in Step S42 and Step S48 respectively are compared, the variation amount in the ASE light along with the change in the dispersion compensating amount in the variable dispersion compensator is calculated, the variation amount in the ASE light is added to and thus is reflected on the ASE correction amount, and thus, the ASE correction amount is updated.

Next, in Step S52, the wavelength number in the wavelength multiplexed signal is increased/decreased. Thereby, the power output from the latter stage optical amplifier 23 changes for an amount corresponding to the wavelengths thus increased/decreased, and thus, becomes such as that shown in FIG. 9, (D). In Step S54, the control part 24 switches into the ALC mode, carries out ALC control of the former stage optical amplifier 21 and the latter stage optical amplifier 23 such that the ALC output target level is set in the level corresponding to the wavelength number and the ASE correction is carried out by the ASE correction amount reflecting the variation amount of the ASE light corresponding to the wavelength number. Thus, the processing is finished. Thereby, the wavelength multiplexed signal power output by the latter stage optical amplifier 23 becomes such as that shown in FIG. 9, (F).

When the wavelength number increase/decrease is 0, the power of the wavelength multiplexed signal output by the latter stage optical amplifier 23, after Step S54 is executed, becomes such as that shown in FIG. 8, (D). Carrying out the processing of FIG. 7 with the wavelength increase/decrease number set in 0 is advantageous for when a variation amount in the ASE light caused by a change in the dispersion commentating amount in the variable dispersion compensator 22 degrades due to aging or such.

Figure 10:
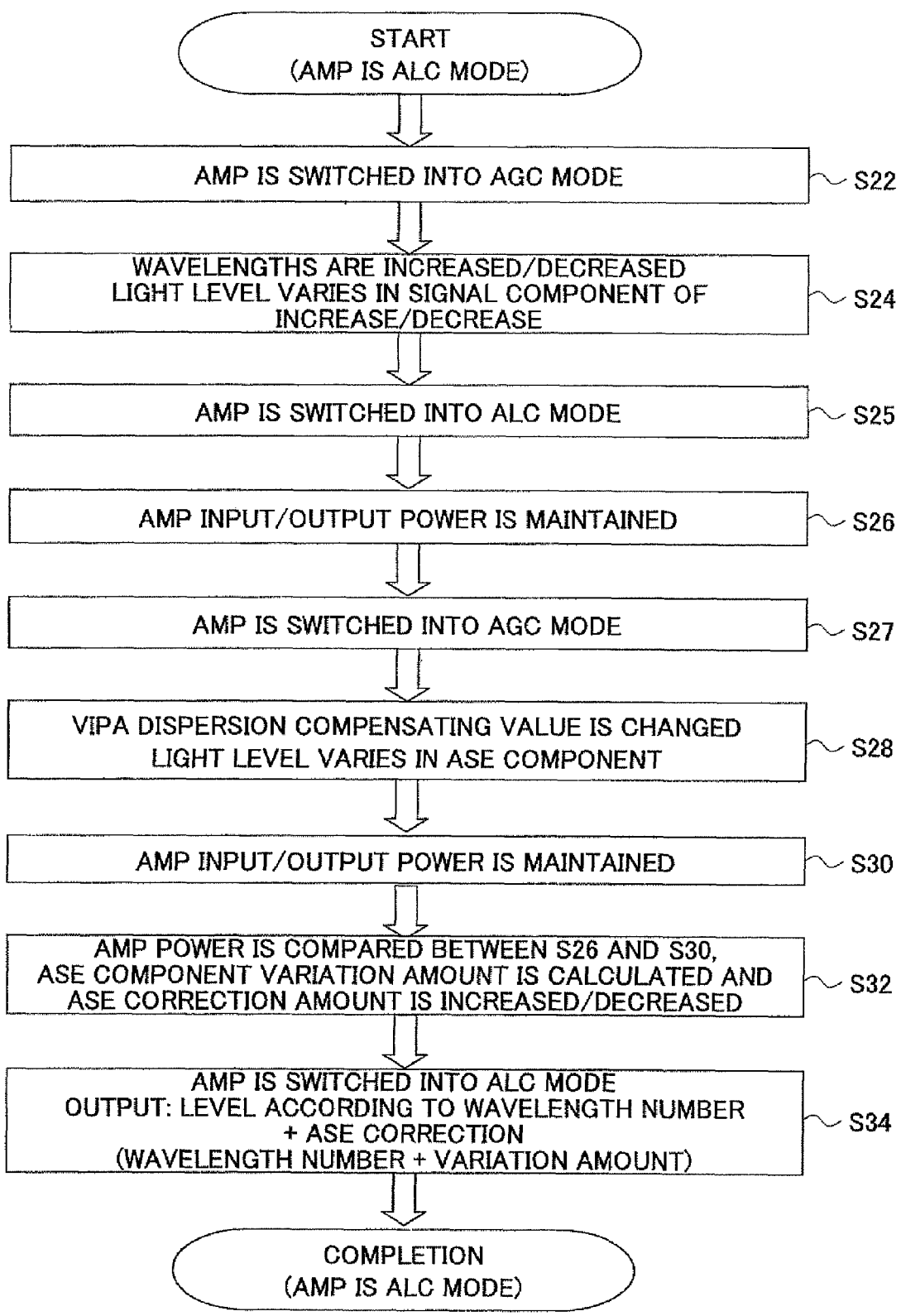
FIG. 10 shows a flow chart of wavelength increase according to the dispersion compensating method in a third embodiment of the present invention.

FIG. 10 shows a flow chart of a third embodiment of the wavelength increase/decrease in the dispersion compensating method according to the present invention. In the figure, the parts same as those of FIG. 7 are given the same reference numerals. This processing is carried out by the control part 24. Upon beginning of this processing, the latter stage optical amplifier 23 is controlled by the control part 24 in an ALC mode such that the ALC output target value is set in a level corresponding to the wavelength number and ASE control corresponding to the wavelength number is carried out. The wavelength multiplexed signal output by the latter stage optical amplifier 23 becomes such as that shown in FIG. 11, (A).

First, in Step S22, the control part 24 switches into an AGC mode, and carries out AGC control of the former stage optical amplifier 21 and the latter stage optical amplifier 23. Thereby, as shown in FIG. 11, (B), the power of the wavelength multiplexed signal output by the latter stage optical amplifier 23 does not change.

Figure 11:
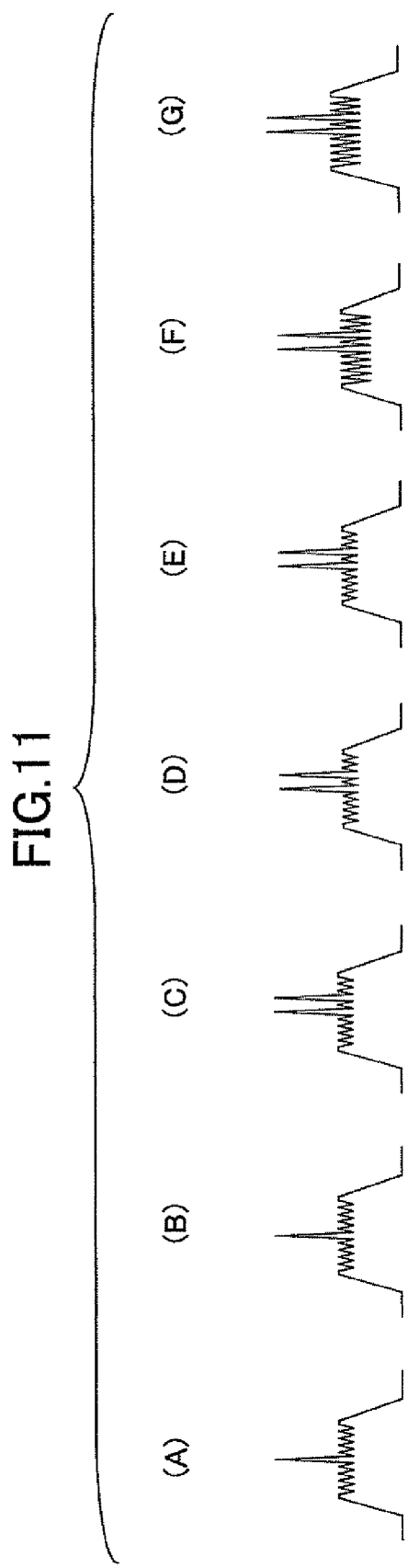
FIG. 11 shows a wavelength/output power characteristics of a wavelength multiplexed signal.

Next, when the wavelength number in the wavelength multiplexed signal is increased/decreased in Step S24, the power of the wavelength multiplexed signal output from the latter stage optical amplifier 23 changes for an amount corresponding to the wavelengths thus increased/decreased, and thus, becomes such as that shown in FIG. 11, (C).

After that, in Step S25, the control part 24 switches into the ALC mode for a given period, carries out ALC control of the former stage optical amplifier 21 and the latter stage optical amplifier 23, and carries out stabilization in the state in which the wavelength increase/decrease is thus made in the wavelength multiplexed signal. Thereby, the power of the wavelength multiplexed signal output by the latter stage optical amplifier 23 becomes such as that shown in FIG. 11, (D) Next, in Step S26, the wavelength multiplexed signal power input to the former stage optical amplifier 21 and the wavelength multiplexed signal power output by the latter stage optical amplifier 23 at this time are detected, and are stored in the control part 24.

After that, in Step S27, the control part 24 switches into an AGC mode, and carries out AGC control of the former stage optical amplifier 21 and the latter stage optical amplifier 23. Thereby, as shown in FIG. 11, (E), the power of the wavelength multiplexed signal output by the latter stage optical amplifier 23 does not change.

Next, in Step S28, based on the wavelength increase/decrease in the wavelength multiplexed signal, the dispersion compensating amount in the variable dispersion compensator 22 is changed. Thereby, the wavelength multiplexed signal power output by the latter stage optical amplifier 23 varies for an amount corresponding to a variation amount of the ASE light, and the wavelength multiplexed signal power output by the latter stage optical amplifier 23 becomes such as that shown in FIG. 11, (F). In Step S30, the wavelength multiplexed signal power input to the former stage optical amplifier 21 and the wavelength multiplexed signal power output by the latter stage optical amplifier 23 are detected, and are stored in the control part 24.

In Step S32, the input/output wavelength multiplexed signal powers detected in Step S26 and Step S30 respectively are compared, the variation amount in the ASE light along with the change in the dispersion compensating amount in the variable dispersion compensator is calculated, the variation amount in the ASE light is added to and thus is reflected on the ASE correction amount, and thus, the ASE correction amount is updated.

Next, in Step S34, the control part 24 switches into the ALC mode, carries out ALC control of the former stage optical amplifier 21 and the latter stage optical amplifier 23 such that the ALC output target level is set in the level corresponding to the wavelength number and the ASE correction is carried out by the ASE correction amount reflecting the variation amount of the ASE light corresponding to the wavelength number. Thus, the processing is finished. Thereby, the wavelength multiplexed signal power output by the latter stage optical amplifier 23 becomes such as that shown in FIG. 11, (G).

FIG. 12 shows a flow chart of a fourth embodiment of the wavelength increase/decrease in the dispersion compensating method according to the present invention. In the figure, the parts same as those of FIG. 7 are given the same reference numerals. This processing is carried out by the control part 24. Upon beginning of this processing, the tatter stage optical amplifier 23 is controlled by the control part 24 in an ALC mode such that the ALC output target value is set in a level corresponding to the wavelength number and ASE control corresponding to the wavelength number is carried out. The wavelength multiplexed signal output by the latter stage optical amplifier 23 becomes such as that shown in FIG. 13, (A).

First, in Step S42, the wavelength multiplexed signal power input to the former stage optical amplifier 21 and the wavelength multiplexed signal power output by the latter stage optical amplifier 23 are detected, and are stored in the control part 24. In Step S44, the control part 24 switches into an AGC mode, and carries out AGC control of the former stage optical amplifier 21 and the latter stage optical amplifier 23. Thereby, as shown in FIG. 13, (B), the power of the wavelength multiplexed signal output by the latter stage optical amplifier 23 does not change.

In Step S46, based on the wavelength increase/decrease in the wavelength multiplexed signal, the dispersion compensating amount is changed. Thereby, the wavelength multiplexed signal power output by the latter stage optical amplifier 23 varies for an amount corresponding to a variation amount of the ASE light, and the wavelength multiplexed signal power output by the latter stage optical amplifier 23 becomes such as that shown in FIG. 13, (C).

After that, the control part 24 switches into the ALC mode in Step S47, carries out ALC control of the former stage optical amplifier 21 and the latter stage optical amplifier 23, and carries out stabilization in a state in which the dispersion compensating amount is thus changed. Thereby, the power of the wavelength multiplexed signal output by the latter stage optical amplifier 23 becomes such as that shown in FIG. 13, (D). Next, in Step S48, the wavelength multiplexed signal power input to the former stage optical amplifier 21 and the wavelength multiplexed signal power output by the latter stage optical amplifier 23 are detected, and are stored in the control part 24.

After that, in Step S49, the control part 24 switches into an AGC mode, and carries out AGC control of the former stage optical amplifier 21 and the latter stage optical amplifier 23. Thereby, as shown in FIG. 13, (E), the power of the wavelength multiplexed signal output by the latter stage optical amplifier 23 does not change.

In Step S50, the input/output wavelength multiplexed signal powers detected in Step S42 and Step S48 respectively are compared, the variation amount in the ASE light along with the change in the dispersion compensating amount in the variable dispersion compensator is calculated, the variation amount in the ASE light is added to and thus is reflected on the ASE correction amount, and thus, the ASE correction amount is updated.

Next, in Step S52, the wavelength number in the wavelength multiplexed signal is increased/decreased. Thereby, the power output from the latter stage optical amplifier 23 changes for an amount corresponding to the wavelengths thus increased/decreased, and thus, becomes such as that shown in FIG. 13, (F). In Step S54, the control part 24 switches into the ALC mode, carries out ALC control of the former stage optical amplifier 21 and the latter stage optical amplifier 23 such that the ALC output target level is set in the level corresponding to the wavelength number and the ASE correction is carried out by the ASE correction amount reflecting the variation amount of the ASE light corresponding to the wavelength number. Thus, the processing is finished. Thereby, the wavelength multiplexed signal power output by the latter stage optical amplifier 23 becomes such as that shown in FIG. 13, (G).

In each embodiment mentioned above, when the number of wavelengths to increase/decrease is large, the wavelength increase/decrease may be achieved in such a manner that a small number of wavelengths such as one wavelength is processed each time, this processing is repeated, and thus, the entire scope of the wavelength increase/decrease may be achieved. Thereby, the change of the light power occurring due to the wavelength increase/decrease can be made gently, and thus, the dispersion compensating amount in the variable dispersion compensator can changed at appropriate timing.

It is noted that Steps S14, S28 and S46 correspond to the claimed dispersion compensating amount varying part; Steps S24 and S52 correspond to the claimed wavelength increasing/decreasing part; Steps S32 and S50 correspond to the claimed ASE variation amount calculating part; Steps S34 and S54 correspond to the claimed ASE variation amount reflecting part; and Steps S25, S27, S47 and S49 correspond to the claimed switching part.

Further, the present invention is not limited to the above-described embodiments, and variations and modifications may be made without departing from the basic concept of the present invention claimed below.

The invention claimed is:

1. A method comprising:
variably compensating for dispersion in a wavelength division multiplexed (WDM) signal by a dispersion compensation amount;
optically amplifying the WDM signal, to thereby provide a WDM signal having been optically amplified and variably dispersion compensated; and
controlling said amplifying in accordance with a power variation in the provided WDM signal due to variation in the dispersion compensation amount.

2. A method as in claim 1, wherein said power variation is a variation of amplified spontaneous emission (ASE) in the provided WDM signal due to variation in the dispersion compensation amount.

3. A method as in claim 1, wherein
said optically amplifying comprises amplifying the WDM signal by a first optical amplifier before being variably dispersion compensated, and amplifying the WDM signal by a second optical amplifier after being variably dispersion compensated, and
said controlling comprising controlling the amplification of the first optical amplifier and the amplification of the second optical amplifier in accordance with the power variation in the provided WDM signal due to variation in the dispersion compensation amount.

4. A method as in claim 1, wherein
said optically amplifying comprises amplifying the WDM signal by a first optical amplifier before being variably dispersion compensated, and amplifying the WDM signal by a second optical amplifier after being variably dispersion compensated, and
said controlling comprises controlling each of the first and second optical amplifiers to amplify the WDM signal with automatic level control (ALC) adjusted in accordance with a variation of amplified spontaneous emission (ASE) in the provided WDM signal due to variation in the dispersion compensation amount.

5. A method as in claim 1, wherein
said optically amplifying comprises amplifying the WDM signal by a first optical amplifier before being variably dispersion compensated, and amplifying the WDM signal by a second optical amplifier after being variably dispersion compensated, and
said controlling comprises,
when a number of wavelengths in the WDM signal is not being changed, controlling each of the first and second optical amplifiers to amplify the WDM signal with automatic level control (ALC) adjusted in accordance with a variation of amplified spontaneous emission (ASE) in the provided WDM signal due to variation in the dispersion compensation amount, and when the number of wavelengths in the WDM signal is being changed, controlling each of the first and second optical amplifiers to amplify the WDM signal with automatic gain control (AGC).

6. An apparatus comprising:
a variable dispersion compensator variably compensating for dispersion in a wavelength division multiplexed (WDM) signal by a dispersion compensation amount;
at least one optical amplifier optically amplifying the WDM signal, to thereby provide a WDM signal having been optically amplified and variably dispersion compensated;
a controller controlling said at least one optical amplifier in accordance with a power variation in the provided WDM signal due to variation in the dispersion compensation amount.

7. An apparatus as in claim 6, wherein said power variation is a variation of amplified spontaneous emission (ASE) in the provided WDM signal due to variation in the dispersion compensation amount.

8. An apparatus as in claim 6, wherein
said at least one optical amplifier comprises a first optical amplifier amplifying the WDM signal before being variably dispersion compensated, and a second optical amplifier amplifying the WDM signal after being variably dispersion compensated, and
said controller controls the amplification of the first optical amplifier and the amplification of the second optical amplifier in accordance with the power variation in the provided WDM signal due to variation in the dispersion compensation amount.

9. An apparatus as in claim 6, wherein
said at least one optical amplifier comprises a first optical amplifier amplifying the WDM signal before being variably dispersion compensated, and a second optical amplifier amplifying the WDM signal after being variably dispersion compensated, and
the controller controls each of the first and second optical amplifiers to amplify the WDM signal with automatic level control (ALC) adjusted in accordance with a variation of amplified spontaneous emission (ASE) in the provided WDM signal due to variation in the dispersion compensation amount.

10. An apparatus as in claim 6, wherein
said at least one optical amplifier comprises a first optical amplifier amplifying the WDM signal before being variably dispersion compensated, and a second optical amplifier amplifying the WDM signal after being variably dispersion compensated, and
the controller,
when a number of wavelengths in the WDM signal is not being changed, controls each of the first and second optical amplifiers to amplify the WDM signal with automatic level control (ALC) adjusted in accordance with a variation of amplified spontaneous emission (ASE) in the provided WDM signal due to variation in the dispersion compensation amount, and
when the number of wavelengths in the WDM signal is being changed, controls each of the first and second optical amplifiers to amplify the WDM signal with automatic gain control (AGC).

11. An apparatus comprising:
a first optical amplifier optically amplifying a wavelength division multiplexed (WDM) signal;
a variable dispersion compensator variably compensating for dispersion in the WDM signal amplified by the first optical amplifier;
a second optical amplifier optically amplifying the WDM signal after being variably compensated for dispersion by the variable dispersion compensator; and
a controller controlling the amplification of the first optical amplifier and the amplification of the second optical amplifier in accordance with a power variation in the WDM signal after being amplified by the second optical amplifier due to variation in the dispersion compensation amount.

12. An apparatus as in claim 11, wherein said power variation is a variation of amplified spontaneous emission (ASE) in the WDM signal after being amplified by the second optical amplifier due to variation in the dispersion compensation amount.

13. An apparatus as in claim 11 wherein the controller controls each of the first and second optical amplifiers to amplify the WDM signal with automatic level control (ALC) adjusted in accordance with a variation of amplified spontaneous emission (ASE) in the WDM signal after being amplified by the second optical amplifier due to variation in the dispersion compensation amount.

14. An apparatus as in claim 11, wherein
the controller, when a number of wavelengths in the WDM signal is not being changed, controls each of the first and second optical amplifiers to amplify the WDM signal with automatic level control (ALC) adjusted in accordance with a variation of amplified spontaneous emission (ASE) in the WDM signal after being amplified by the second optical amplifier due to variation in the dispersion compensation amount, and
the controller, when the number of wavelengths in the WDM signal is being changed, controls each of the first and second optical amplifiers to amplify the WDM signal with automatic gain control (AGC).

15. An apparatus comprising:
a first optical amplifier optically amplifying a wavelength division multiplexed (WDM) signal;
a variable dispersion compensator variably compensating for dispersion in the WDM signal amplified by the first optical amplifier;
a second optical amplifier optically amplifying the WDM signal after being variably compensated for dispersion by the variable dispersion compensator; and
means for controlling the amplification of the first optical amplifier and the amplification of the second optical amplifier in accordance with a power variation in the WDM signal after being amplified by the second optical amplifier due to variation in the dispersion compensation amount.

16. An apparatus comprising:
a variable dispersion compensator variably compensating for dispersion in a wavelength division multiplexed (WDM) signal by a dispersion compensation amount;
means for optically amplifying the WDM signal, to thereby provide a WDM signal having been optically amplified and variably dispersion compensated; and
means for controlling said means for optically amplifying in accordance with a power variation in the provided WDM signal due to variation in the dispersion compensation amount.

* * * * *

UNITED STATES PATENT AND TRADEMARK OFFICE
CERTIFICATE OF CORRECTION

PATENT NO. : 7,627,207 B2 Page 1 of 1
APPLICATION NO. : 11/689946
DATED : December 1, 2009
INVENTOR(S) : Masahiro Yoshimoto et al.

It is certified that error appears in the above-identified patent and that said Letters Patent is hereby corrected as shown below:

Column 12, Line 18, change "claim 11" to --claim 11,--

Signed and Sealed this

Sixteenth Day of March, 2010

David J. Kappos
*Director of the United States Patent and Trademark Office*